(12) United States Patent
Arana et al.

(10) Patent No.: US 10,701,365 B2
(45) Date of Patent: Jun. 30, 2020

(54) SYSTEMS AND METHODS FOR SCENE CATEGORIZATION

(71) Applicant: Disney Enterprises, Inc., Burbank, CA (US)

(72) Inventors: Mark Arana, Burbank, CA (US); Jared McPhillen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/838,307

(22) Filed: Dec. 11, 2017

(65) Prior Publication Data

US 2019/0182486 A1  Jun. 13, 2019

(51) Int. Cl.

| | | |
|---|---|---|
| *H04N 9/80* | (2006.01) | |
| *G11B 27/00* | (2006.01) | |
| *H04N 19/139* | (2014.01) | |
| *G11B 27/19* | (2006.01) | |
| *H04N 19/179* | (2014.01) | |
| *H04N 21/234* | (2011.01) | |
| *H04N 19/177* | (2014.01) | |
| *G11B 27/34* | (2006.01) | |
| *H04N 5/95* | (2006.01) | |
| *H04N 7/12* | (2006.01) | |

(52) U.S. Cl.
CPC .......... *H04N 19/139* (2014.11); *G11B 27/19* (2013.01); *G11B 27/34* (2013.01); *H04N 19/177* (2014.11); *H04N 19/179* (2014.11); *H04N 21/23418* (2013.01)

(58) Field of Classification Search
USPC ................ 386/278, 239, 281, 282, 283, 285
See application file for complete search history.

(56) References Cited

U.S. PATENT DOCUMENTS

| | | | | |
|---|---|---|---|---|
| 5,642,174 | A * | 6/1997 | Kazui .................... | H04N 19/00 348/699 |
| 10,180,775 | B2 * | 1/2019 | Laska .............. | G08B 13/19613 |
| 2003/0223500 | A1* | 12/2003 | Yu ........................ | H04N 11/044 375/240.27 |
| 2012/0307109 | A1* | 12/2012 | Morioka .............. | G11B 27/034 348/231.3 |
| 2014/0282777 | A1* | 9/2014 | Gonder ................. | H04L 65/605 725/109 |
| 2015/0074129 | A1* | 3/2015 | Friedrich ................ | G06F 16/21 707/756 |

FOREIGN PATENT DOCUMENTS

| | | |
|---|---|---|
| JP | 09-261648 | 10/1997 |
| JP | 5685732 | 3/2015 |

* cited by examiner

*Primary Examiner* — Daquan Zhao
(74) *Attorney, Agent, or Firm* — Farjami & Farjami LLP

(57) ABSTRACT

Systems and methods are provided for manually or automatically identifying delineating scenes in media content. Scene categorization parameters setting forth thematic and/or cinematic criteria are used to analyze frames or groups of pictures (GOPs) making up the media content. Those frames or GOPs having one or more characteristics that meet the thematic and/or cinematic criteria may be deemed to belong or be a part of a particular scene in the media content. Downstream applications or processes can be optimized based on the scene segmentation.

10 Claims, 4 Drawing Sheets

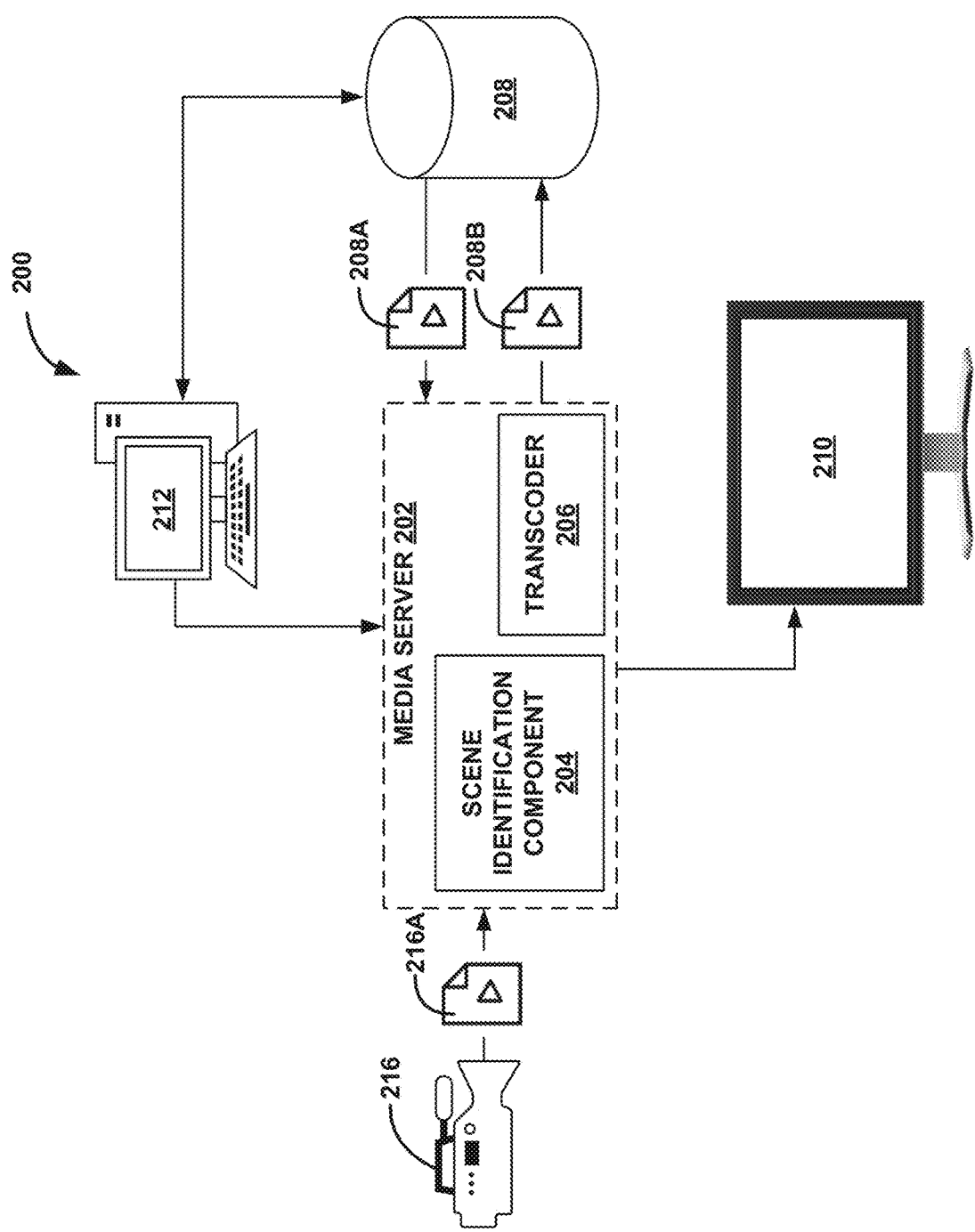

SYSTEMS AND METHODS FOR SCENE CATEGORIZATION

TECHNICAL FIELD

The present disclosure relates generally to digital media encoding, and more particularly, some embodiments relate to systems and methods for identifying scenes for downstream applications, such as transcoding.

DESCRIPTION OF THE RELATED ART

Due to the growing number of digital media distribution platforms that are available, a single piece of media content, such as a movie, is often digitized or transcoded into different formats and/or bit-rates. Many content distributors create multiple versions of a single video, song, or other digital media program for multiple avenues of distribution. For example, for a single piece of content, a video distributor might maintain a plurality of different files having the same resolution but different bitrates. These groups of files may be used in web distribution using adaptive variable bitrate streaming techniques. Moreover, different portions of media content may be utilized to generate previews, highlight clips, and the like for distribution.

BRIEF SUMMARY OF THE DISCLOSURE

In accordance with one embodiment, a computer-implemented method comprises receiving a media content comprising a plurality of media blocks, and receiving scene delineation parameters setting forth at least one of thematic and cinematic criteria. The method further comprises identifying sets of media blocks meeting at least one of the thematic and cinematic criteria as defining scenes in the media content. Further still, the method comprises forwarding at least one of the sets of media blocks and scene boundary information based on the sets of media blocks to one or more downstream applications adapted to process the defined scenes in the media content.

In some embodiments, the media content comprises one of a movie and video clip in a source file format. In some embodiments, the plurality of media blocks comprises one of a plurality of frames or a plurality of groups of pictures (GOPs).

In some embodiments, at least one of the thematic and cinematic criteria comprises at least one of GOP motion vector criteria, object presence criteria, object movement over a GOP criteria, audio fingerprint criteria, color-related criteria, luminance criteria, relative frame type amounts, predetermined scene metadata, and audio to script correspondence criteria.

In some embodiments, the computer-implemented method further comprises automatically identifying sub-scenes within the defined scenes in the media content. The automatic identification of the sub-scenes comprises refining a first automatic identification of the sets of media blocks meeting at least a first one of the thematic and cinematic criteria defining sub-scenes with a second automatic identification of the sets of the media blocks meeting at least a second one of the thematic and cinematic criteria.

In some embodiments, the scene boundary information comprises scene in and out points. The sets of media blocks meeting the at least one of the thematic and cinematic criteria as defining the scenes in the media content comprises sets of GOPs or scene boundaries. The identified sets of media blocks comprise those sets of media blocks in which at least one of the thematic and cinematic criteria are met by one or more characteristics present in two or more media blocks.

In accordance with another embodiment, a non-transitory computer-readable medium has computer executable program code embodied thereon that causes a computer system to: recognize existence of one or more characteristics present in one or more media blocks comprising media content; determine whether the one or more characteristics meet at least one of thematic and cinematic criteria indicative of a scene of the media content; and upon a determination that the one or more characteristics meet the at least one of the thematic and cinematic criteria, determine start and end boundaries of the scene.

In some embodiments, the computer executable program code is configured to further cause the computer system to receive one or more scene categorization parameters setting forth the at least one of thematic and cinematic criteria. In some embodiments, the media content comprises one of a movie or video clip. In some embodiments, the movie or video clip is rendered in one of a non-encoded file format or a mezzanine file format. The media content comprises one of live broadcast or live streaming media content.

In some embodiments, the one or more media blocks comprises one or more frames or one or more groups of pictures (GOPs). In some embodiments, the at least one of the thematic and cinematic criteria comprises at least one of motion vector criteria, object presence criteria, audio fingerprint criteria, color-related criteria, luminance criteria, relative frame type amounts, predetermined scene metadata, and audio to script correspondence criteria.

In some embodiments, the computer executable program code configured to cause the computer to determine whether the one or more characteristics meet at least one of thematic and cinematic criteria indicative of a scene of the media content comprises computer executable program code configured to further cause the computer to perform motion vector analysis to determine common movement of at least one element in two or more of the media blocks.

In some embodiments, the computer executable program code configured to cause the computer to determine whether the one or more characteristics meet at least one of thematic and cinematic criteria indicative of a scene of the media content comprises computer executable program code configured to further cause the computer to determine relative numbers of intra-coded frames, bi-directional predicted frames, and predicted frames.

In some embodiments, the bi-directional predicted frames and the predicted frames are suggestive of corresponding ones of the media blocks belonging to the scene. In some embodiments, the computer executable program code configured to cause the computer to determine whether the one or more characteristics meet at least one of thematic and cinematic criteria indicative of a scene of the media content comprises computer executable program code configured to further cause the computer to determine whether the one or more media blocks have the same or similar color and luminance levels.

In some embodiments, the computer executable program code configured to cause the computer to determine whether the one or more characteristics meet at least one of thematic and cinematic criteria indicative of a scene of the media content comprises computer executable program code configured to further cause the computer to determine whether audio in the one or more media blocks corresponds with at least one of audio fingerprints, script dialogue, and scene metadata information indicative of the scene.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A illustrates an example transcoding system to which automated scene categorization can be applied in accordance with one embodiment.

The figures are not exhaustive and do not limit the present disclosure to the precise form disclosed.

DETAILED DESCRIPTION

Transcoding media content into different formats and/or bitrates most often includes compressing un-encoded data or encoded data with high bitrates, such as source or mezzanine files. A lossy encoding process sacrifices information to compress data. Many digital media encoding techniques follow a common chain of steps: (1) prediction; (2) transformation and quantization; and (3) entropy coding. The output files produced by many such techniques are in the form of a sequence of groups of pictures (GOPs). A GOP may comprise a key frame, or intra-frame (I-frame), followed by various inter-frames, such as P-frames, B-frames, or b-frames. During the transcoding process, GOPs are identified, and can be anywhere from about 1 frame to (typically) 240 frames. For example, a group or set of 240 frames would make up a 10 second GOP.

In accordance with various embodiments, scenes making up media content, such as a movie, an episode of a television show, a video clip, or other digital media content may be automatically identified. The term scene as utilized herein can refer to a group of pictures, frames, or other media blocks making up a media content having some thematic or cinematic commonality or consistency between them. The automatic identification of scenes in media content can be leveraged so that downstream processes and/or applications can be tailored to the specific characteristics of those scenes. For example, from the transcoding perspective, it would be advantageous to allow transcoding to be performed on a per-scene basis, rather than on the basis of the media content as a whole.

Figure 1:
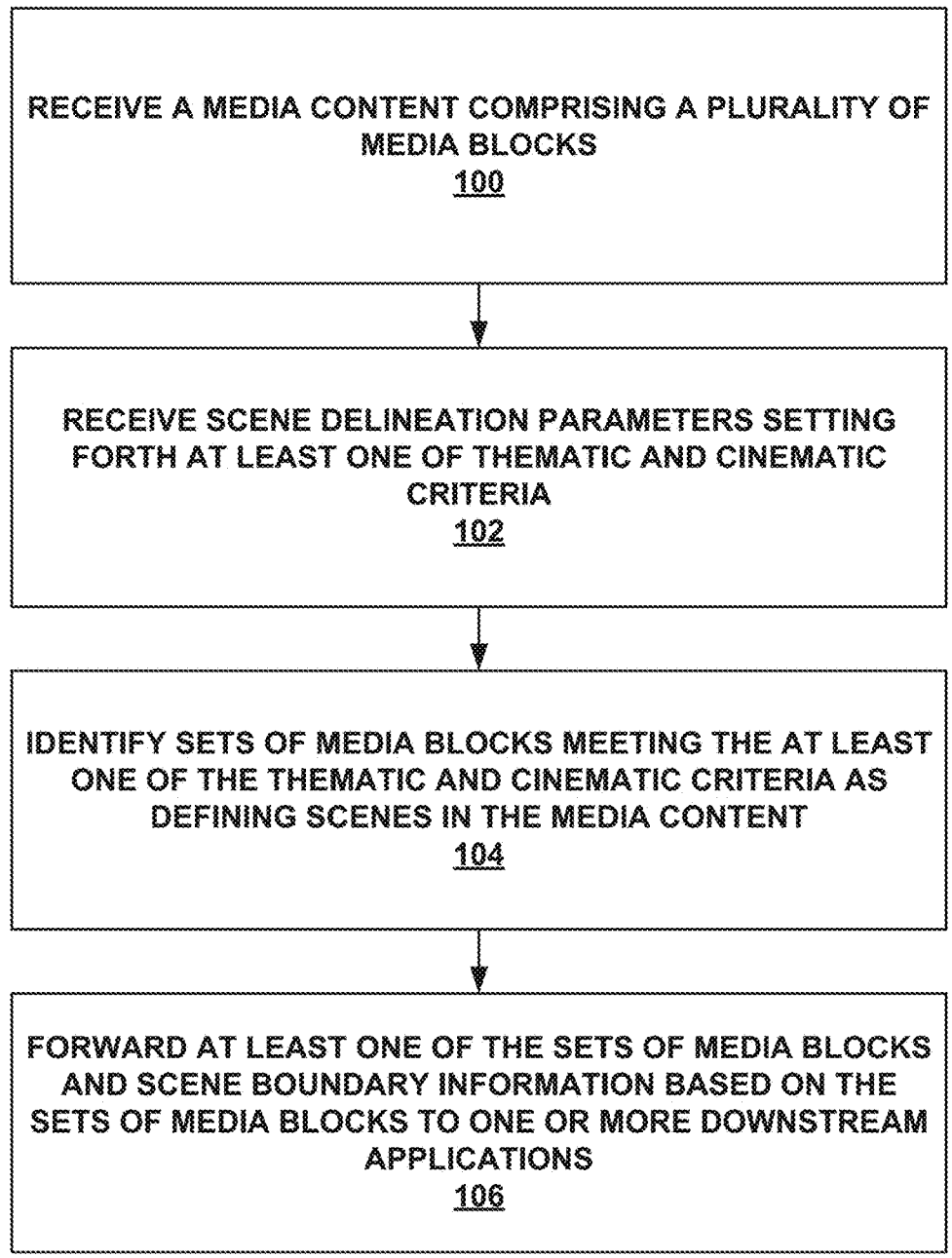
FIG. 1 is an operational flow diagram illustrating an example process for automated scene categorization in accordance with various embodiments.

FIG. 1 illustrates example operations that may be performed for identifying scenes of a media content in accordance with various embodiments. FIG. 1 will be described in conjunction with FIG. 2A. FIG. 2A is an example transcoding system 200 in which automated scene categorization can be applied in accordance with one embodiment.

Referring to FIG. 1, a media content may be received, wherein the media content comprises a plurality of media blocks at operation 102. As described above, a media content may be a movie, audio, video, or other digital media content in the form of a source file, such as a raw video file, a high bitrate master, such as a mezzanine file, or the like. Media blocks may be frames, pictures, or other subsets of the media content.

Referring to FIG. 2A, a source file 208A can be received at a media server from a datastore 208, such as a content database operated by a content provider, content developer, and the like. In this case, source file 208A may be obtained from datastore 208 and sent to a media server 202 for "downstream" processing by a downstream processing device/application. Here, the downstream processing device/application may be a transcoder 206 performing transcoding functions. It should be noted that other downstream processes or applications can include, but are not limited to those for optimizing media content characteristics, optimizing luminance for high dynamic range (HDR) media content authoring, creating derivative media content, such as preview or highlight clips, etc. In some embodiments, transcoder 206 may generate an output file for presentation directly to a client, such as a display 210 or set-top box operatively connected to display 210 (not shown), a media consumption device, e.g., laptop or tablet PC (not shown), etc.

It should be noted that media server 202 is illustrated with a dashed outline to signify that scene categorization component 204 and/or transcoder 206 need not necessarily be implemented in a server entity. In some embodiments, one or more of scene categorization component 204 and transcoder 206 may be implemented in, e.g., computer 212, through which the system user specifies scene delineation parameters (described below). In some embodiments, it is computer 212 that produces the media content source file, which may be stored locally, or may be sent to datastore 208 for storage. In some embodiments, a source file may be a raw media file, such as a raw video file. FIG. 2A illustrates such a scenario, where camera 216 may be used to capture the video in the form of a raw video file 216A. Raw video file 216A may be transmitted to media server 202 to be transcoded by transcoder 206, as previously discussed. It should be noted that in some embodiments, scene categorization as disclosed herein may be performed in real or near-real time, e.g., in the case of raw video file 216A being streamed or broadcast live.

At operation 102, scene delineation parameters setting forth at least one of thematic and cinematic criteria may be received. That is, a system user may specify one or more parameters that can be used to determine whether or not common or related thematic and/or cinematic characteristics of media blocks making up a media content signify a particular scene.

Referring to FIG. 2A, the scene delineation parameters may be received by scene categorization component 204. As will be described below, scene delineation parameters may be used by scene categorization component 204 to determine what media blocks making up the media content include a characteristic(s) that can be deemed as being indicative of a particular scene.

Examples of scene delineation parameters may include, but are not limited to certain motion, object, audio, color, predetermined scene/script criteria that if met, signify the presence of one or more characteristics indicating that the media block(s) having such characteristics are part of a particular scene. For example, frames making up a particular scene, such as a scene during which a car explodes, can be identified. Frames that make up such a scene may contain thematic and/or cinematic characteristics including, but not limited to images of the car, images of car debris flying away from a particular point in the frame, and images having high luminance values. As another example, a scene may involve dialogue between two actors or characters. In this example, frames in which the two actors are present, and/or audio portions of the media content that contain audio that matches a script or scene metadata between the two actors or characters may be identified.

At operation 104, sets of media blocks meeting at least one of the thematic and cinematic criteria defining scenes in the media content can be identified. That is, those media blocks having some common characteristics, e.g., the existence of particular actors or characters, the existence of images indicative of a certain action sequence, etc. can be determined to belong to a particular scene. For example, those frames that include imagery associated with the car, e.g., the car itself prior to its explosion, car debris, frames that have high luminance indicative of the explosion, etc., can be grouped together as being indicative of a particular car explosion scene. For example, frames that include the two actors or characters identified as being part of the dialogue scene, and/or audio segments that match a portion of the script identified as the dialogue scene can be grouped together as being indicative of the dialogue scene.

It should be noted that identification can be automated or manually performed. As one example of manual identification, during the color grading process, a colorist may define scene elements that will create media block boundaries. These scenes (during the color grading process) will have their own color, luminance, etc. characteristics. The output of this data can be used to create the input into "downstream applications" described below.

At operation 106, at least one of the sets of media blocks and scene boundary information based on the sets of media blocks are forwarded to one or more "downstream applications." Referring to FIG. 2A, the sets of media blocks, e.g., frames or sets of GOPs, can be forwarded to transcoder 206 so that the sets of media blocks can be transcoded via a method optimized to this type of thematic content. In some embodiments, transcoder 206 may comprise multiple processing units or transcode nodes so that multiple sets of media blocks can be transcoded in parallel. In some embodiments, scene start/end or scene in/out points (scene boundary information) can be forwarded to transcoder 206 informing transcoder 206 as to which media blocks make up a particular scene. In some embodiments, scene boundary information may comprise timecodes or other codes indicative of beginning and end frames or media blocks. In this way, transcoder 206 can partition a received source file, e.g., source file 208A, into appropriate scene segments for transcoding.

It should be understood that as used herein, the term "media block" refers to a portion of media that contains scene boundary information, i.e., a scene boundary exists within a media block. That is, a scene boundary inherits its characteristics from a media block.

Figure 2B:
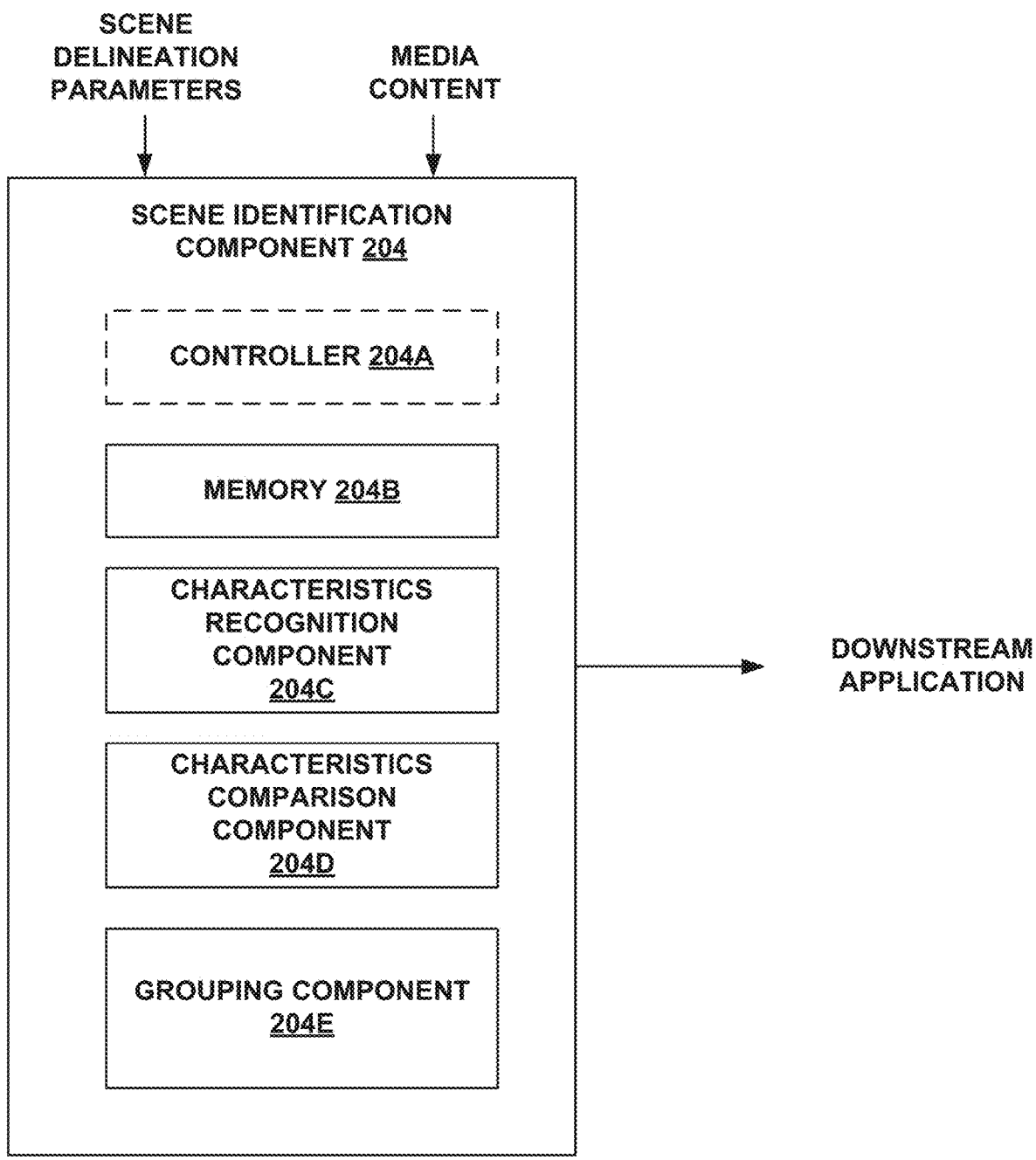
FIG. 2B illustrates example aspects of a scene categorization system for identifying scenes in accordance with various embodiments.

FIG. 2B illustrates an example scene categorization component 204 for performing automated scene categorization in accordance with various embodiments. FIG. 2B illustrates scene categorization component 204 as including a controller 204A, a memory 204B, a characteristics recognition component 204C, a characteristics comparison component 204D, and a grouping component 204E. Scene delineation parameters may be received by scene categorization component 204, and stored in memory 204B. Controller 204A may control operation of characteristics recognition component 204C, characteristics comparison component 204D, and grouping component 204E as follows.

Characteristics recognition component 204C may analyze the media content to determine if a frame, picture, media block, etc. has characteristics matching those specified in the scene delineation parameters. For example, scene delineation parameters may be based upon one or more of, but not limited to the following: motion vectors, object recognition, audio recognition, hue and luminance values, scene metadata descriptions, script-audio matching, etc.

Regarding motion vectors, scene delineation parameters may specify that scene categorization component 204 vis-à-vis characteristics recognition component 204C should look for motion vectors attached to the media's macroblocks, e.g., vectors representative of the relative motion of pixels from frame to frame of a movie. Such motion vectors may signify that a particular frame of a movie represents an explosion, e.g., motion vectors would represent the motion of objects or debris (which in turn are represented by pixels), pixels representative of bright light, etc.

Scene categorization component 204 may utilize machine learning techniques to analyze media blocks, such as frames of a movie or video clip for motion vectors representative of the movement, i.e., distance between pixels in neighboring frames. Following the car explosion example, scene categorization component 204 may determine the existence of motion vectors indicating motion in a particular direction(s) suggestive of an explosion. In some embodiments, motion vector analysis may merely involve determining the existence of relatively high motion action versus relatively low motion action. Other scene delineation parameters or characteristics described below, e.g., object recognition, may be used in conjunction with motion vector analysis to further refine a determination that the motion vector analysis has identified a car explosion. In some embodiments, computer vision may be used to determine the thematic elements existing in a scene.

In terms of object recognition, scene delineation parameters may specify that scene categorization component 204 vis-à-vis characteristics recognition component 204C should look for particular objects, faces of actors, and the like in a media block, such as a media content frame or picture. Some embodiments may use computer vision to do so.

Characteristics recognition component 204C may do the same for audio signals or fingerprints representative of a song (that is played within a scene, described below), hue, luminance, and other characteristics. Characteristics of media blocks may also be recognized based upon scene metadata descriptions and script-audio correspondence. For example, characteristics recognition component 204C may receive a description of scenes (determined by the media content producer or distributor) set forth in the metadata. Characteristics recognition component 204C may then analyze the audio associated with a media block to determine whether or not the audio present in the media block corresponds to the script/scene description.

In some embodiments, characteristics recognition component 204C may leverage media content metadata such as scene in/out information provided during the HDR authoring process and embedded in HDR media content. In some embodiments, this information can be utilized to directly identify scenes in the media content. In other embodiments, characteristics recognition component 204C alone, or in conjunction with characteristics comparison component 204D, described below, can be used to further refine scene delineations, and/or identify and delineate subscenes within scenes.

In some embodiments, GOPs may be analyzed by characteristics recognition component 204C to determine its frame makeup, e.g., the percentage or relative amounts of intra-coded (I)/bi-directional predicted (B)/predicted (P) frames. For example, I-frames contain a complete image representative of a particular frame, whereas P-frames hold only information indicative of image changes relative to a previous frame. B-frames only hold information indicative of image differences relative to a preceding and following frame. The existence of I-frames in a GOP can suggest a new scene or transition into a new scene, while the presence of P and/or B-frames can suggest the continuation of an existing scene. This is because there tend to be less differences between images belonging to the same scene which may be reflected in the use of P and B-frames.

It should be noted that the scene categorization parameters setting forth thematic and cinematic criteria can vary. That is, thresholds for characteristics suggesting a particular scene can fluctuate. For example, scene categorization parameters may specify that a scene is identified by the existence of water in a water-based scene. A media content may have two sequential water-based scenes in which two different ships are presented in water. In some embodiments, based on the scene categorization parameters, the two water-based scenes may be delineated as separate scenes owing to the presence of the two different ships. In some embodiments, the scene categorization parameters can specify the two sequential water-based scenes as a single water-based scene irrespective of the presence of two different ships in the relevant frames.

Characteristics comparison component 204D, based on the recognition of certain characteristics present in a media block, can analyze neighboring media blocks to determine whether the neighboring media blocks include the same/similar characteristics. If so, grouping component 204E designates those media blocks having common characteristics as belonging to a particular scene.

In some embodiments, a maximum number of media blocks, e.g., frames making up a GOP, can be specified, and a maximum number of GOPs that may make up a scene can also be specified. That number or some median number of media blocks or GOPS before and/or after a current media block or GOP being analyzed can be used for comparison.

In some embodiments, characteristics comparison component 204D may analyze media blocks and/or GOPs to determine whether common characteristics exist between the media blocks and/or GOPs. That is, those media blocks and/or GOPs meeting some minimum number of common characteristics or level of commonality exists may be deemed to be representative of a scene.

After scenes of the media content have been delineated, scene in/out points and/or output files representative of the sets of the media blocks comprising each of the scenes can be forwarded to a downstream application. As previously discussed, transcoder 206 (FIG. 2A) may be one example of a downstream application in which scene segments of the media content can be leveraged to optimize the downstream application.

Figure 3:
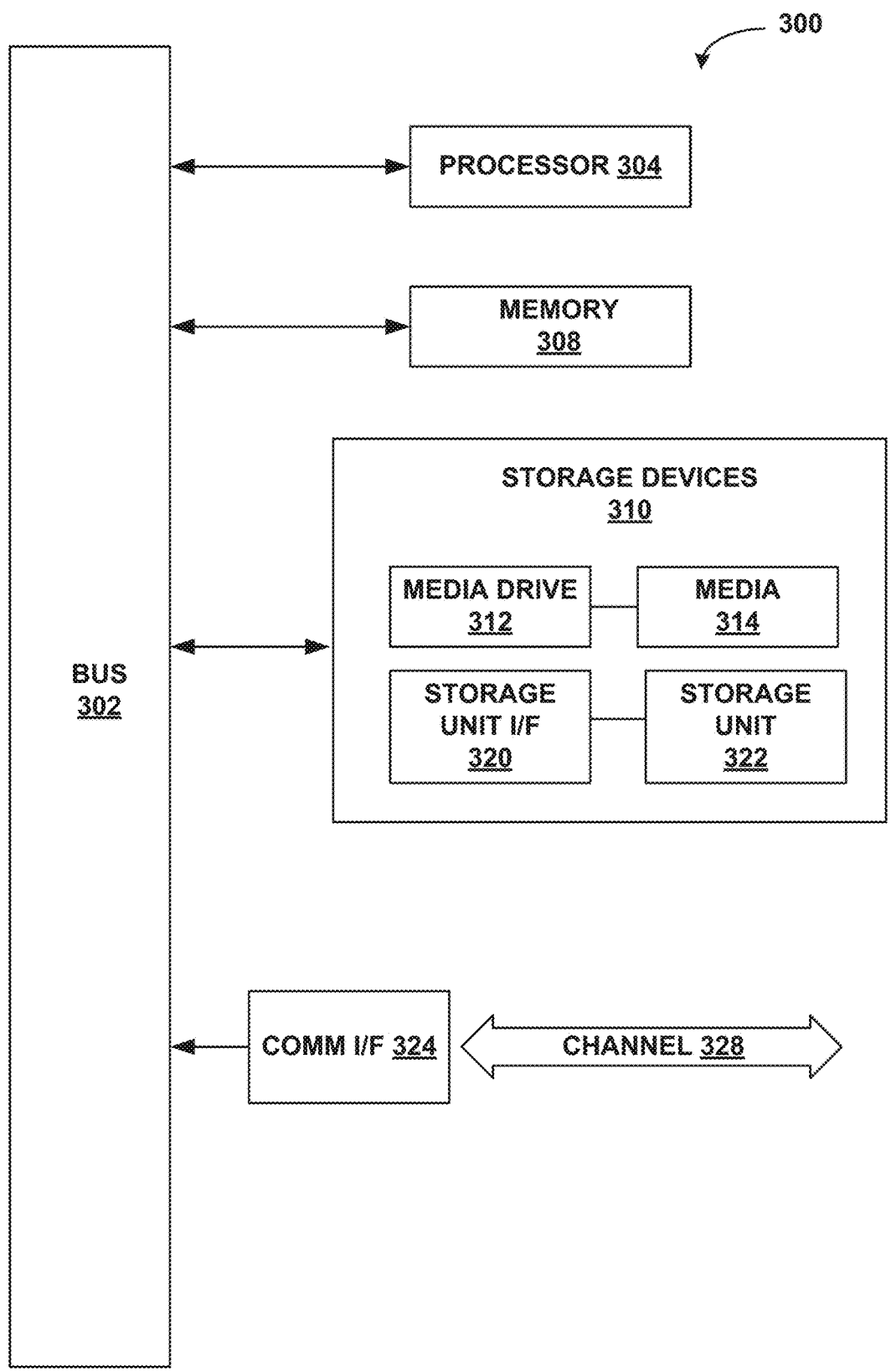
FIG. 3 is an example computing component that may be used to implement various features of embodiments described in the present disclosure.

FIG. 3 illustrates an example computing component that may be used to implement various features of the system and methods disclosed herein, for example, computer 212, transcoder 206, datastore 208, scene categorization component 204, transcoder 206, and/or any of their respective component parts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Referring now to FIG. 3, computing component 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example navigation systems, portable computing devices, and other electronic devices that might include some form of processing capability.

Computing component 300 might include, for example, one or more processors, controllers, control components, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing component 300 or to communicate externally.

Computing component 300 might also include one or more memory components, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 314 might include, for example, a hard disk, an integrated circuit assembly, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot, a PCMCIA slot and card, and other fixed or removable storage units 322 and interfaces 320 that allow software and data to be transferred from the storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer-readable medium having computer executable program code embodied thereon, the computer executable program code configured to cause a computer system to:

recognize existence of one or more characteristics present in two or more groups of pictures (GOPs) of media content, wherein each of the two or more GOPs starts with a respective I-frame followed by one or more respective inter-frames;

determine whether the one or more characteristics present in the two or more GOPs meet thematic criteria indicative of a scene of the media content;

in response to determining that the one or more characteristics present in the two or more GOPs meet the thematic criteria, determine a start of the respective I-frame of the first one of the two or more GOPs and an end of the last one of the two or more GOPs; and transmit the two or more GOPs and the determined start and end of the two or more GOPs to a transcoder.

2. The non-transitory computer-readable medium of claim 1, wherein the media content comprises a movie or video clip.

3. The non-transitory computer-readable medium of claim 1, wherein the media content comprises a live broadcast or live streaming media content.

4. The non-transitory computer-readable medium of claim 1, wherein the thematic criteria comprises at least one of motion vector criteria, object presence criteria, audio fingerprint criteria, color-related criteria, luminance criteria, relative frame type amounts, predetermined scene metadata, or audio to script correspondence criteria.

5. The non-transitory computer-readable medium of claim 4, wherein the thematic criteria comprises at least one of motion vector criteria, and wherein determining whether the one or more characteristics present in the two or more GOPs meet the thematic criteria indicative of the scene of the media content comprises performing motion vector analysis to determine common movement of at least one element in the two or more GOPs.

6. The non-transitory computer-readable medium of claim 1, wherein determining whether the one or more characteristics present in the two or more GOPs meet the thematic criteria indicative of the scene of the media content comprises determining relative numbers of intra-coded frames, bi-directional predicted frames, and predicted frames.

7. The non-transitory computer-readable medium of claim 6, wherein the bi-directional predicted frames and the predicted frames are suggestive of corresponding ones of the two or more GOPs belonging to the scene.

8. The non-transitory computer-readable medium of claim 1, wherein determining whether the one or more characteristics present in the two or more GOPs meet the thematic criteria indicative of the scene of the media content comprises determining whether the two or more GOPs have identical or similar luminance levels.

9. The non-transitory computer-readable medium of claim 1, wherein determining whether the one or more characteristics present in the two or more GOPs meet the thematic criteria indicative of the scene of the media content comprises determining whether audio in the two or more GOPs corresponds with at least one of audio fingerprints, script dialogue, or scene metadata information indicative of the scene.

10. The non-transitory computer-readable medium of claim 1, wherein the computer executable program code is further configured to cause a computer system to:

transcode the scene of the media content using the two or more GOPs and the determined start and end of the two or more GOPs, using the transcoder optimized for scenes meeting the thematic criteria.

* * * * *